United States Patent [19]
Quinn

[11] Patent Number: 5,898,421
[45] Date of Patent: Apr. 27, 1999

[54] GYROSCOPIC POINTER AND METHOD

[75] Inventor: Thomas J. Quinn, Los Gatos, Calif.

[73] Assignee: Gyration, Inc., Saratoga, Calif.

[21] Appl. No.: 08/643,991

[22] Filed: May 7, 1996

Related U.S. Application Data

[63] Continuation of application No. 08/406,727, Mar. 20, 1995, abandoned, which is a continuation of application No. 08/000,651, Jan. 5, 1993, Pat. No. 5,440,326, which is a continuation of application No. 07/497,127, Mar. 21, 1990, abandoned.

[51] Int. Cl.⁶ .................................................. G09G 5/00
[52] U.S. Cl. ............................ 345/156; 345/157; 345/158
[58] Field of Search ............................ 345/156, 157, 345/161, 163, 166

[56] References Cited

U.S. PATENT DOCUMENTS

| | | | |
|---|---|---|---|
| 2,309,853 | 2/1943 | Lyman et al. | 33/204 |
| 3,782,205 | 1/1974 | Fletcher et al. | 73/497 |
| 4,267,731 | 5/1981 | Jacobson | 73/505 |
| 4,489,609 | 12/1984 | Burdess et al. | 73/505 |
| 4,580,006 | 4/1986 | Hull | 178/18 |
| 4,601,206 | 7/1986 | Watson | 73/514 |
| 4,639,547 | 1/1987 | Jacob-Grinschgl et al. | 178/18 |
| 4,644,793 | 2/1987 | Church | 73/505 |
| 4,831,544 | 5/1989 | Hojo et al. | 364/453 |
| 4,839,838 | 6/1989 | LaBiche et al. | 364/709.11 |
| 5,068,645 | 11/1991 | Drumm | 340/710 |
| 5,097,707 | 3/1992 | Church | 73/505 |
| 5,142,655 | 8/1992 | Drumm | 379/52 |
| 5,287,119 | 2/1994 | Drumm | 345/158 |
| 5,288,078 | 2/1994 | Capper et al. | 273/148 |
| 5,329,276 | 7/1994 | Hirabayashi | 340/870.31 |
| 5,363,120 | 11/1994 | Drumm | 345/158 |
| 5,453,758 | 9/1995 | Sato | 345/158 |

FOREIGN PATENT DOCUMENTS

| | | | |
|---|---|---|---|
| 62-143124 | 6/1987 | Japan | G06F 3/033 |

*Primary Examiner*—Matthew Luu
*Attorney, Agent, or Firm*—Fenwick & West LLP

[57] ABSTRACT

A vertical gyroscope is adapted for use as a pointing device for controlling the position of a cursor on the display of a computer. A motor at the core of the gyroscope is suspended by two pairs of orthogonal gimbals from a hand-held controller device and nominally oriented with its spin axis vertical by a pendulous device. Electro-optical shaft angle encoders sense the orientation of a hand-held controller device as it is manipulated by a user and the resulting electrical output is converted into a format usable by a computer to control the movement of a cursor on the screen of the computer display. For additional ease of use, the bottom of the controller is rounded so that the controller can be pointing while sitting on a surface. A third input is provided by providing a horizontal gyroscope within the pointing device. The third rotational signal can be used to either rotate a displayed object or to display or simulate a third dimension.

15 Claims, 6 Drawing Sheets

(SECTION A-A)

GYROSCOPIC POINTER AND METHOD

This is a continuation of application Ser. No. 08/406,727, filed on Mar. 20, 1995, now abandoned, which is a continuation of Ser. No. 08/000,651, filed on Jan. 5, 1993, now U.S. Pat. No. 5,440,326, which is a continuation of Ser. No. 07/497,127, filed on Mar. 21, 1990, now abandoned.

BACKGROUND OF THE INVENTION

1. Field

The present invention relates to the field of hand-held computer controllers. More specifically, the present invention relates to a hand-held gyroscopic pointer adapted for use as a cursor-control device for a computer.

2. Art Background

A. Computer controllers:

Historically, computer instructions have taken the form of commands entered as words on a keyboard. More recently, pointing devices and icon-based interface techniques have been developed which permit a computer user to select tasks and to enter commands by moving a cursor on a computer display screen in response to movement of a pointing device. Pointing devices used for this task have included joysticks, trackballs and mouse controllers. One early use of a mouse as a pointing device for an icon-based computer interlace was at Xerox PARC. More recently, the mouse has become well known as a computer input device with its use on the Apple Macintosh line of computers and on the workstation computers distributed by Sun Microsystem.

However, a mouse, requires a relatively large and flat 2-dimensional surface on which to move. Typically, this surface must be unobstructed and dedicated to mouse movement and measure over 9"×9". As a result, other controllers, such as the trackball and joystick, are often used when flat surfaces are unavailable, as in the case of portable computers. However, trackballs and joysticks are constrained to use on a surface for practical applications.

Further, trackballs, joysticks, keys and mice are not mobile in free space nor do they provide three-dimensional output. One controller which is mobil in space is taught by Ronald E. Milner in this U.S. Pat. No. 4,862,152, "Sonic Positioning Device," issued Jan. 25, 1990. This device senses the position of a controller device in three dimensions by sensing the position of an ultrasonic transmitter relative to an array of receivers. However this device is not a true pointing device as it senses position rather than a vector from the device. Since the controller must be repositioned in space, rather than simply reoriented, relatively large hand movements are required to define cursor movements. Another controller mobil in free space, the Mattel Power Glove video game controller, incorporates two ultrasonic transmitters in a single controller and thus can determine a position as web as define a "pointing" vector through the two transmitters. However, both of these ultrasonic controllers are based on ranging techniques and thus have range and resolution limitations. Specifically, both must be used in conjunction with an array of receivers to determine the exact position of the controllers. This results in reduced accuracy as the controller is moved to a position more distant from the receivers. Further, these controllers are only use able in an active volume of space defined by those receivers. Further still, both are limited to use in relatively noise-free environments.

B. Gyroscopes:

Attitude indicators in aircraft, known as artificial horizons, use two-degree-of-freedom gyroscopes for inertia space reference and the measurement of pitch and roll relative to the gravitational vector. The gravity vector is approximated by a pendulous device (suspended weight) which indicates the apparent vertical, that is, the combined effect of gravity and acceleration. Such a device, as described in *Gyroscopic Theory Design, and Instrumentation*, 1980, Wrigley, Hollister and Denhard, The M.I.T. Press, Cambridge, Mass., does not correctly indicate the true direction of gravity at any instant because of vehicle accelerations. However, the average direction of the apparent vertical over a period of several minutes approximates the direction of gravity well enough to provide an attitude reference. Gyroscopes thus provide a known technique for measuring roll and pitch relative to a gravity vector. However, gyroscopes are typically heavy and expensive and have not been successfully adapted to practical use as a handheld pointing devices for cursor control in computers.

Accordingly, it is desirable to provide a hand-held computer control device which has a long range and high resolution. Further, the controller should not be constrained to use on a flat surface or within a confined space. Further, it is desirable to have a controller which responds to a vector defined by the controller, i.e. responds to "pointing" of the controller, as opposed to merely detecting the position of the controller. It is desirable to have a controller which is self-contained and not subject to interference form outside sources of noise or subject to reduced accuracy as it is moved distant from an array of receivers. Further, it is desirable to provide a controller that produces three-dimensional output.

SUMMARY OF THE INVENTION

The present invention comprises a hand-held gyroscope adapted for use as a cursor control device for a computer. A motor at the core of the gyroscope is suspended by two pairs of orthogonal gimbals from a hand-held controller device which provide two-degrees-of-freedom for the gyroscope. The spin axis of the motor is norminally oriented vertically by a pendulous device. Electro-optical shaft angle encoders sense the rotation of a hand held controller device about the gyroscope as it is manipulated by a user and the resulting electrical output is converted into a format usable by a computer to control the x-y movement of a cursor on a two dimensional display screen of a computer display. The controller thus responds to angular movements of a user's hand, which permits relatively large and accurate movements of a cursor to be accurately defined without requiring correspondingly large and tiring hand movements. Further, the controller is self-contained and is thus not subject to sources of outside noise or constrained to use within any active volume. For additional ease of use, the bottom of the controller is rounded so that the controller can be reoriented or "pointed" while sitting on a surface The resulting controller device is thus responsive to a vector defined by the controller, i.e. the "pointing" of the controller, as opposed to merely detecting its position, and can be used either in free space or while sitting on a surface. Unlike a classical pointing device such as a stick or a flashlight, it does not require both position and vector information to "point" to another fixed position. Rather, the vector information (i.e. "pitch" and "roll") is transformed directly into the "x" and "y" coordinates of a cursor position on a computer display. Further, by including a second gyroscope in the controller with the spin axis of the second gyroscope orthogonal to the first, "yaw" information, i.e. the angle of rotation of the controller about the spin axis of the first gyroscope, can be measured. This angle is transformed directly into the "z" information, and used to control rotation of objects or to otherwise alter the computer display, such as by making an object appear closer or further away, in response to "z" axis information. This controller is highly accurate as the result of using electro-optic shaft angle encoders, and not limited to use on a flat surface or an active volume. It allows the input of three dimensional input, in the form of "pitch," "roll," and "yaw" angles, which are transformed into "x," "y," and "z" coordinates for input to a computer for the control of the cursor location and screen display. Further, since it is self contained, it is not subject to ambient noise, such as is the case with ultrasonic controllers.

These and other advantages and features of the invention will become readily apparent to those skilled in the art after reading the following detailed description of the invention and studying the accompanying drawings.

DETAILED DESCRIPTION OF THE PREFERRED EMBODIMENT

Figures 1, 1A:
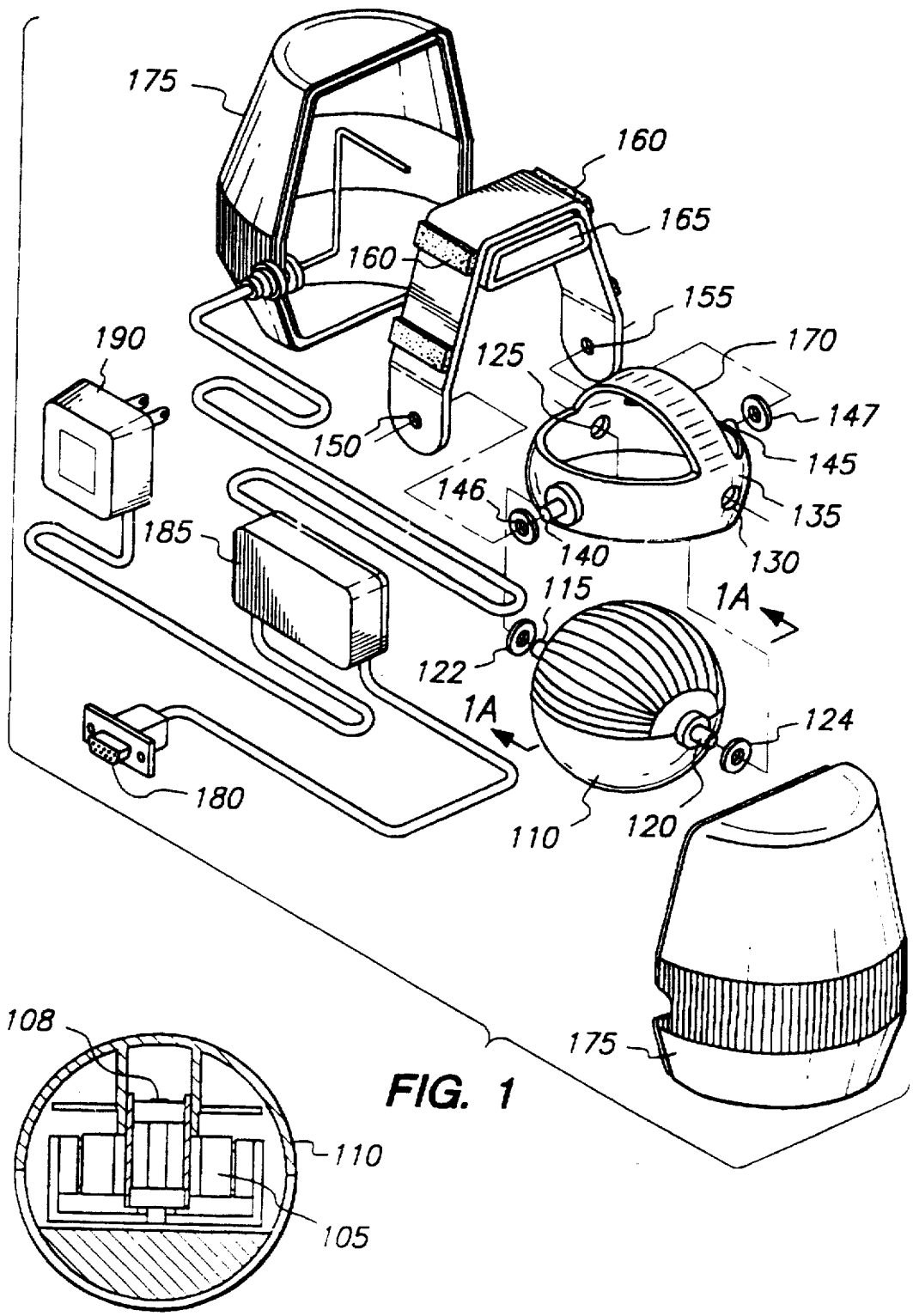
FIGS. 1 and 1A are an expanded perspective view of one embodiment of the preferred invention.

FIG. 1 is an expanded perspective view of one embodiment of the present invention. A brushless D.C. motor 105 at the core of the gyroscope spins continuously, providing the angular momentum that stabilizes the inner part of the gyroscope. Brushless D.C. Motors 105 is a motor such as used in miniature cooling fans distributed by U.S. TOYO Fan Corporation. Brushless D.C. Motors 105 is illustrated in the vertical cross section A—A of FIG. 1, and is firmly mounted to inner module 110 with motor shaft 108 aligned orthogonally with respect to the axis of rotation of inner module 110 about inner gimbals 115 and 120. Inner module 110 consists of injection molded plastic and two conductive inner gimbals gimbal 115 and gimbal 120. Inner gimbals 115 and 120 are located on and aligned with the axis of rotation of inner module 110. Further, inner gimbals 115 and 120 are electrically coupled to motor 105. The center of mass of inner module 110, which includes motor 105, is slightly displaced along the axis of rotation of motor shaft 108 below the axis of rotation of inner module 110. This results in a pendulous affect which causes motor shaft 108 to generally align with the gravity vector.

Inner gimbals 115 and 120 mechanically support inner module 110 and also provide an electrical path for the transmission of power from the gimbals to motor 105 without restricting the travel of inner module 110. Two bearings support the inner gimbals relative to gimbal frame 135. Specifically, bearing 122 is mounted within bearing alignment hole 125 of gimbal frame 135 and supports inner gimbal 115. Similarly, bearing 124 is mounted within bearing alignment hole 130 of gimbal frame 135 and supports inner gimbal 120. Gimbal frame 135 includes two conductive outer gimbals 140 and 145. Two bearings support the outer gimbals relative to shock frame 160. Specifically, bearing 146 is mounted within bearing alignment hole 150 of shock frame 160 and supports outer gimbal 140. Similarly, bearing 147 is mounted within bearing alignment hole 155 of shock frame 160 and supports outer gimbal 145. Outer gimbal 140 is electrically coupled to inner gimbal 115. Similarly, outer gimbal 145 is electrically coupled to inner gimbal 120. This completes the electrical path from the non-rotating shock frame 160 to motor 105 within inner module 110.

Shock frame 160 is mounted with shock absorbing rubber to outer housing 175, which consists of two halves. This shock mounting prevents damage to the bearings or optical sensors in the event that the gyroscope is dropped, and permits the inner assemblies to be constructed with finer tolerances than would be possible without the shock mounting. Shaft angle encoder sensing optics 165, discussed in more detail below, are mounted on shock frame 160.

Figure 5:
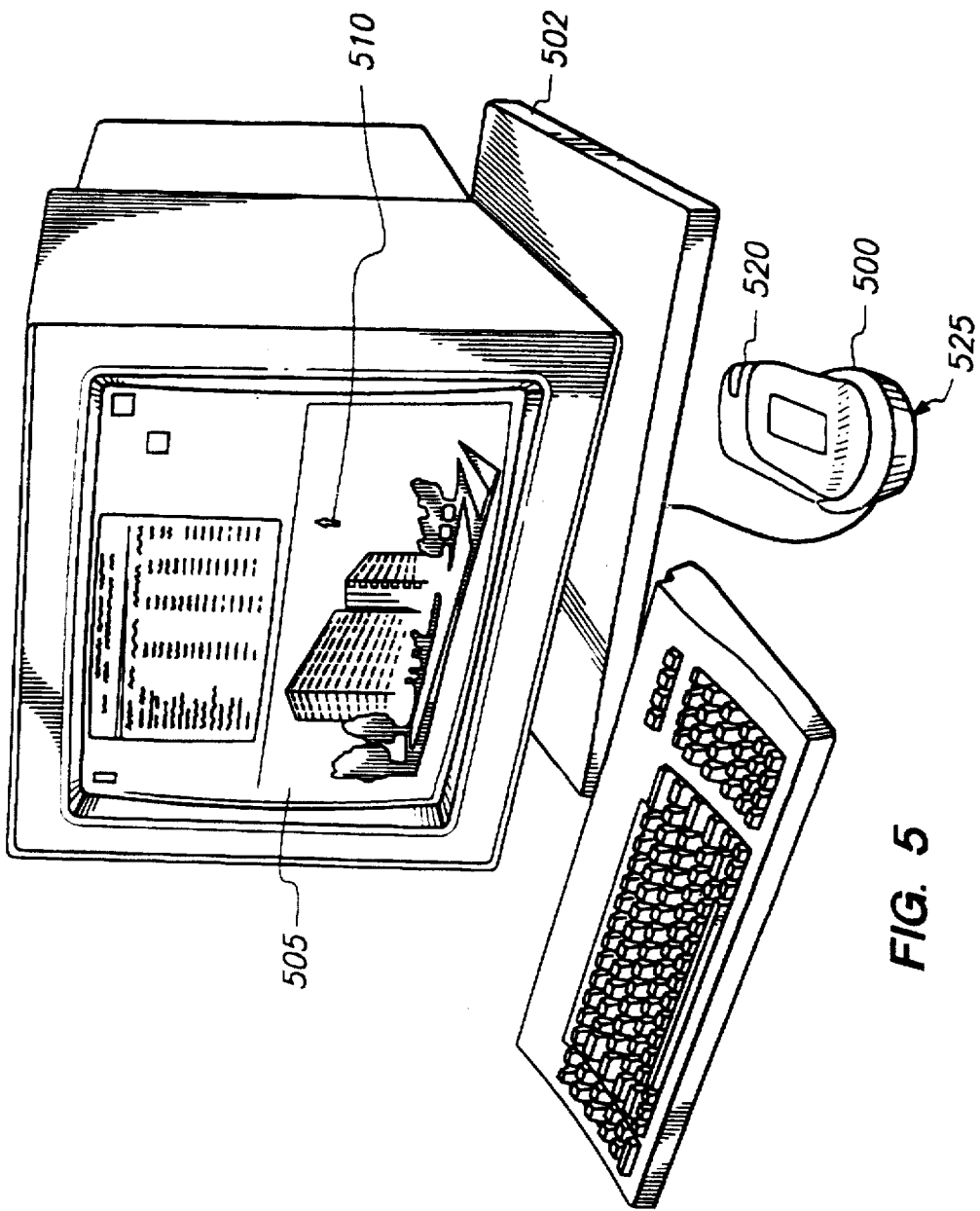
FIG. 5 is an illustration of the preferred embodiment of a gyroscopic pointing device 500 coupled to a computer and computer display 505.

Outer housing 175 is opaque so as to prevent outside light from interfering with the optical sensing system and is adapted for hand holding as described more fully below with reference to FIGS. 5 and 6.

Cabling 180 transmits power from an interlace box 185 to outer housing 175 and returns data signals from shaft angle encoder sensing optics 165. In the preferred embodiment interface box 185 translates signals from the optical sensing system 165 into serial data for an RS-232 port. Wall adapter 190 provides D.C. power for motor 105 and shaft angle encoder sensing optics 165.

Figure 2:
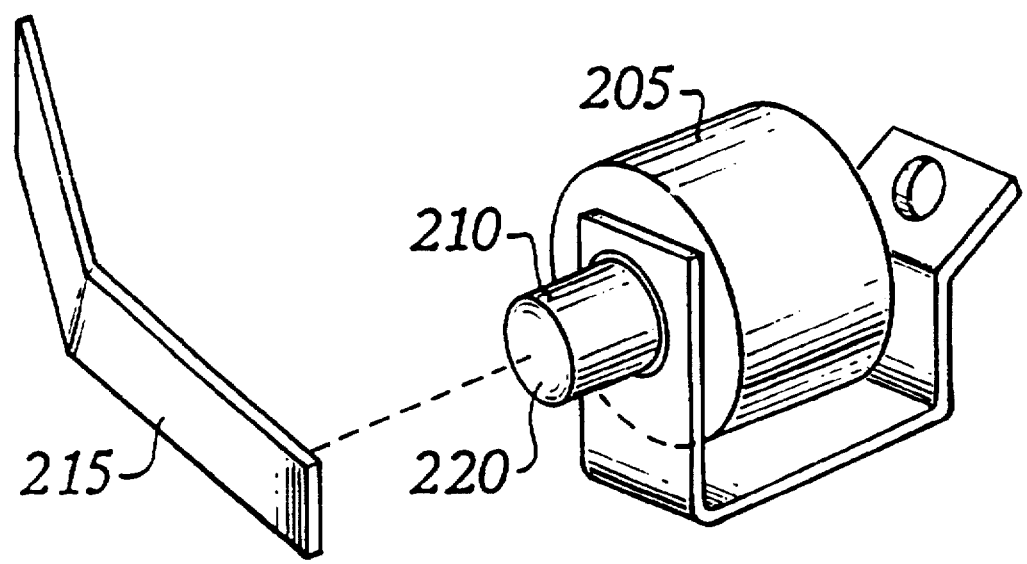
FIG. 2 is an expanded perspective view of inner gimbal 115 and bearing 122.

The construction details of the inner and outer gimbals is shown in further detail in FIG. 2. FIG. 2 is an expanded perspective view of inner gimbal 115 and bearing 122. Inner gimbal 115 includes a circular plug 205 which fits within the inner race of bearing 122. A conductive pin 210, having a diameter smaller than that of plug 205, is mounted concentrically with plug 205 and electrically coupled to motor 205. Pin 210 is preferably made of a low-friction conductive material such as carbon-teflon and designed to protrude from the inner race of bearing 122. The diameter of pin 210 is smaller than the diameter of the inner race so as not contact the inner race and to minimize the friction of the rotating contact. A stainless steel spring 215 is mounted to gimbal frame 135 and aligned with and in electrical contact with protruding surface 220 of pin 210. Spring 215 is electrically coupled to a D.C. power source through outer gimbal 140. Spring 215 presses against pin 210 providing a low friction electrical connection between gimbal frame 135 and inner module 110. Inner gimbal 120 and outer gimbals 140 and 145 are constructed in an identical manner.

Figure 3:
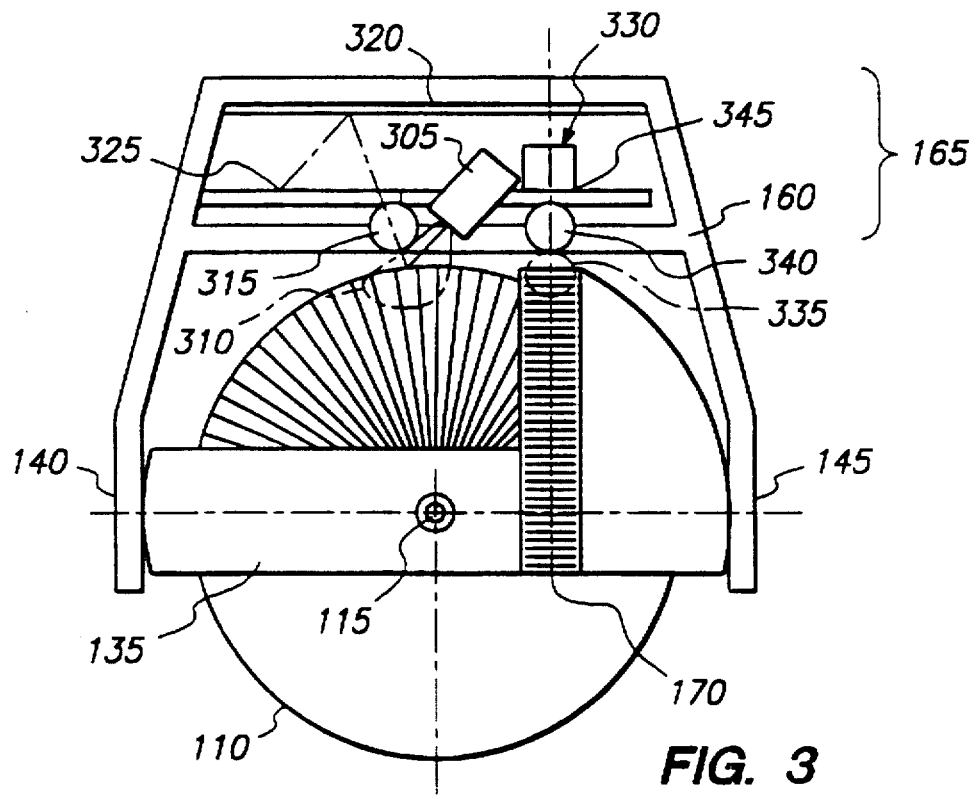
FIG. 3 is an illustration of the optical pattern on inner module 110, the optical pattern on gimbal frame 135, and the elements of shaft angle encoder sensing optics 165.

Inner module 110 has a hemispherical outer surface with an optical pattern which interacts with shaft angle encoder sensing optics 165 to sense the rotation of inner module 110 around the axis of rotation through gimbals 115 and 120. This optical pattern is illustrated in FIG. 3. The optical pattern on inner module 110 is constructed by first painting the hemispherical surface with a highly reflective aluminum flaked paint and then machining grooves of 0.015 inch depth and width along "lines of longitude" from gimbal 115 towards gimbal 120 along the surface. The grooves are machined to within 30 degrees of each inner gimbal and are 0.015 inches apart at 30 degrees from each gimbal. The pattern causes the spacing between the groove centerlines to widen to approximately 0.04 inches at the middle ("equator") of inner module 110. Inner module 110 is molded from a non-reflective black plastic. Thus the grooved portions of inner module 110, where the reflective paint has been machined off, are non-reflective. This provides a precise optical pattern on inner module 110 having a relatively high contrast ratio.

And second optical pattern is machined into gimbal frame 135 along a cylindrical section 170 of gimbal frame 135. This pattern interacts with shaft angle encoder sensing optics 165 for sensing rotation of gimbal frame 135 around its axis of rotation through gimbals 140 and 145. This cylindrical section is geometrically centered about the axis of rotation of gimbal frame 135, which passes through gimbals 140 and 145. As with the optical pattern on the inner module 110, the optical pattern on gimbal frame 135 is constructed by applying reflective paint to cylindrical section 170 and then machining grooves of 0.015 inch depth and width on the surface of the cylinder.

These grooves are machined along lines parallel to the axis of rotation of gimbal frame 135 and evenly spaced so that the light and dark strips are of equal width. Cylindrical section 170 is displaced slightly from the center of gimbal frame 135 so as not lo interfere with the interaction of shaft angle encoder sensing optics 165 and the optical pattern on inner module 110. Specifically, the closest edge of cylindrical section 170 is spaced approximately 0.15 inches away from the "equator" of frame 170 passing through inner gimbals 115 and 120.

Shaft angle encoder sensing optics 165 interact with the optical pattern on inner module 110 so as to determine the rotation of the inner module 110 about its axis of rotation. More specifically, shaft angle encoder sensing optic 165 include sources for illuminating the patterns, lenses for focusing images of the patterns, and photodetectors for detect a dark or light areas. Referring to FIG. 3, a first LED 305 is mounted to shock frame 160 at an angle of 30 degrees from vertical in a plane parallel to the axis through gimbals 140 and 145 so as to floodlight an area 310 of the optical pattern on inner module 110. This area is centered on the "equator" of frame 135 so as to provide maximum range of detectable movement in both directions. Lens 315 and mirror 320 focus and reflect the image of the illuminated optical pattern onto quad photodiode 325. Lens 315 is an injection molded lens of approximately ⅛ inch in diameter having a focal length of approximately 0.2 inches.

Figure 4:
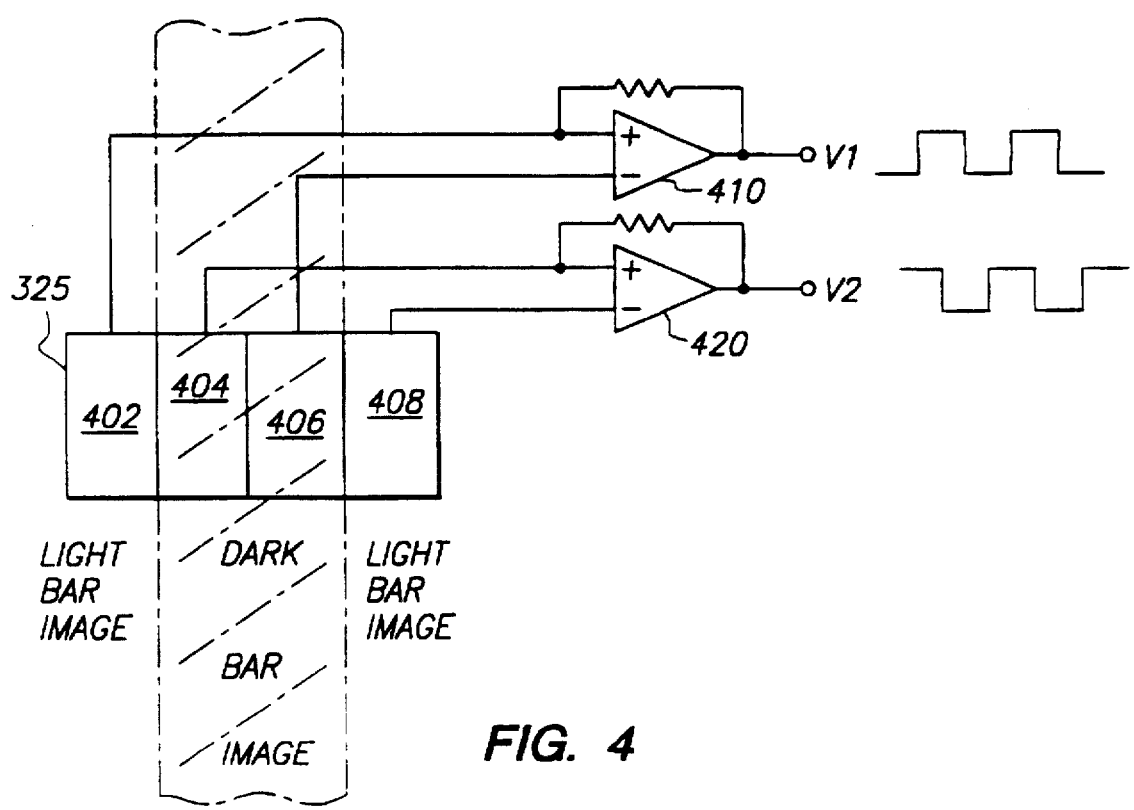
FIG. 4 is an illustration of a quad photodiode.

Quad photodiode 325 comprises four photodiodes, 402, 404, 406 and 408, located in a row as illustrated in FIG. 4. The sides of quad photodiode 325 are aligned with the edges of the projected image of the optical pattern on inner module 110. One period of the projected image of the optical pattern on inner module 110 (one light and one dark bar) nominally covers the quad photodiode 325, which comprise four photodiodes centered 0.02 inches apart. Photodiodes 402 and 406 are counted to comparator 420. Photodiodes 404 and 408 are coupled to comparator 410. The output V1 of comparator 410 is thus in phase quadrature with the output V2 of comparator 420. These outputs are then detected by conventional means to determine the rotation of the inner module. An example of phase quadrature resolution is provided in U.S. Pat. No. 4,346,989 titled Surveying Instrument, issued to Alfred F. Gori and Charles E. Moore Aug. 31, 1982 and assigned to the Hewlett-Packard Company. A prototype of this embodiment of the present invention results in a resolution of approximately 100 counts per inch.

Shaft angle encoder sensing optics 165 also interacts with the optical pattern on gimbal frame 160 so as to determine the rotation of gimbal frame 135 about its axis of rotation. More specfically, a second sensing system, similar to the one described but oriented 90 degrees with respect to the first, is positioned on frame 160 so as to interact with the optical pattern on frame 135 and to detect rotation of frame 135 about its axis of rotation. Referring again to FIG. 3, a second LED 330 is mounted to shock frame 160 at an angle of 30 degrees from vertical in a plane parallel to the axis through gimbals 115 and 120 in alignment with cylindrical section 170 so as to floodlight an area 335 of the optical pattern on cylindrical section 170. Lens 340 and mirror 320 focus and reflect the image of the illuminated optical pattern onto quad photodiode 345. Lens 340 is an injection molded lens of approximately ⅛ inch in diameter having a focal length of approximately 0.2 inches.

Quad photodiode 345 comprises four photodiodes located in a row and is identical in construction to quad photodiode 325 illustrated in FIG. 4. The sides of quad photodiode 345 are aligned with the edges of the projected image of the optical pattern on gimbal frame 135. FIG. 5 is an illustration of the preferred embodiment of a gyroscopic pointing device 500 coupled to a computer 502 and computer display 505. Computer 502 is adapted so that changing the pitch of controller 500 relative to the gravity vector charges the vertical position of cursor 510 on computer display 505. That is, rotating the controller forward ("pitch") causes the cursor to drop on a vertical computer screen, rotating it back causes the cursor to rise, as if the controller was pointing at the cursor. Similarly, rotating the controller from side to side ("roll") changes the horizontal position of cursor 510 on computer display 505. That is, rotating the controller left causes the cursor to move left on a vertical computer screen, rotating it right causes the cursor to move to the right, again, as it the controller was pointing at the cursor. Controller 500 further includes a thumb operated push button 520 and has a rounded hemispherically shaped bottom portion 525 adapted for smoothly rocking on a flat surface when the pitch and roll of controller 500 is varied while resting on a flat surface. This can be a two position switch, where initial pressure on the switch activates the controller and causes the cursor to move in response to the controller, and a second position of the switch results in a"pick" or "select" signal being transmitted to the computer.

Figure 6:
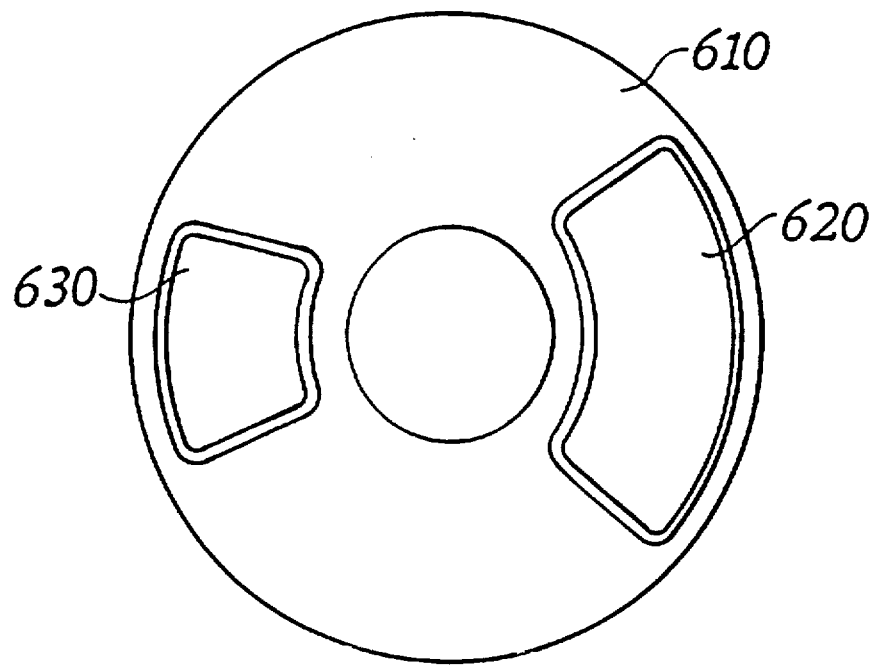
FIG. 6 is a top view of an alternative embodiment of the present invention.
Figure 7:
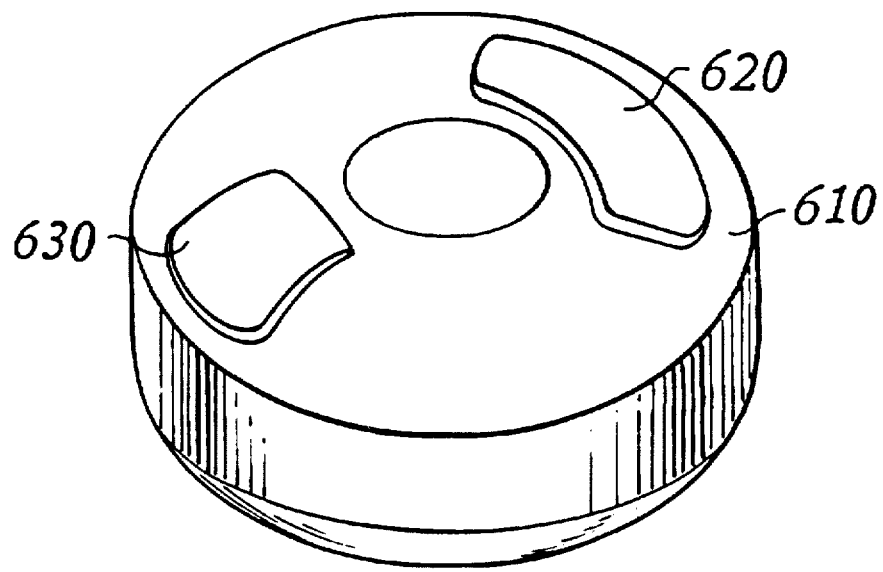
FIG. 7 is a top perspective view of the embodiment of FIG. 6.

FIG. 6 is a top view of an alternative embodiment of the present invention. FIG. 7 is a top perspective view of the same embodiment. Specifically, FIGS. 6 and 7 illustrate a controller shaped so as to be hand held in a manner such that the palm will be facing down while controller 610 is resting on a flat surface. The under side of controller 610 is rounded to facilitate changes of its orientation with respect to vertical. A palm button 620 is actuated when the controller is grasped, thus permitting the controller to be deactivated, moved or reoriented, then reactivated. A pick button 630 is located for selective activation by a users fingers in a manner similar to the use of a pick button on a mouse controller.

Figure 8:
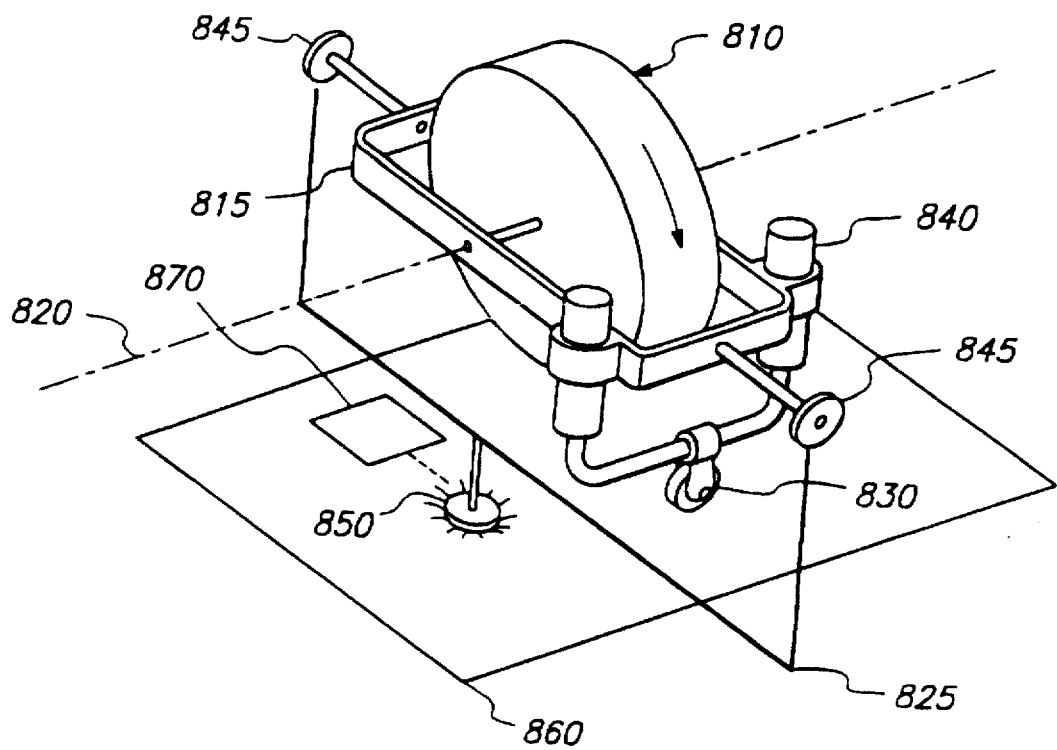
FIG. 8 is a perspective illustrator of a directional gyroscope used to provide three-dimensional output in the embodiment of FIGS. 6 and 7.

The embodiment of FIGS. 6 and 7 includes a first gyroscope as discussed with regards to FIGS. 1–4 for the measurement of pitch and roll. Further, it includes a second gyroscope, as illustrated in FIG. 8, for measurement of yaw about the vertical axis. Specifically, a rotating gyroscopic element 810 is mounted in a two-degree-of freedom gimbal system with its spin axis 820 in a horizontal direction. In the preferred embodiment a mass gives the gyroscope a pendulosity at right angles to spin axis 820. More specifically, gyroscope 810 is mounted to inner frame 815. Inner frame 815 is mounted to gimbal frame 825 by inner gimbals 845. Gimbal frame 825 is mounted to an outer housing 860 by gimbal 850. A shaft angle encoder 870 is coupled to detect the rotation of gimbal frame 825 relative to outer housing 860. Oscillations are damped out by applying an antipendulous torque caused by liquid flow of a viscous fluid through a constriction in a tube, as in damper 840. Computer 502 is further adapted to convert the angle measured by shaft angle encoder 870. This conversion could be to rotation of the cursor or a cursor-selected object or for providing a "z" input for a three dimensional display or a two-dimensional display simulating a three dimensional view.

While the invention has been particularly taught and described with reference to the preferred embodiment, those versed in the art rill appreciate that minor modifications in form and detail may be made without departing from the spirit and scope of the invention. For instance, although the illustrated embodiment teaches one system of shaft angle encoders, many alternative systems could be used for detecting the orientation of the gyroscopic controller. Further, while the preferred embodiment leaches a vertically oriented gyroscope and detection of two angles from vertical such as in an artificial horizon instrument. Other gyroscopic orientations, such as those used for directional gyroscopes, could be substituted. Further, while the present invention teaches the detection of two angles from a vertically oriented gyroscope and one angle from a horizontally oriented gyroscope, two angles could be detected from the horizontal gyroscope and one from the vertical gyroscope. Further, many techniques equivalent techniques to the pendulous are known for orienting gyroscopes. Accordingly, all such modifications are embodied within the scope of this patent as properly come within our contribution to the art and are particularly pointed out by the following claims.

I claim:

1. A method for moving a displayed object on an interactive computer graphic display having vertical and horizontal Cartesian coordinate axes in response to one of pitch and yaw rotations of an input device, the method comprising the steps of:

detecting the pitch or yaw rotation of the device;

sensing an inertial response to provide a signal indicative of at least one of the pitch and yaw rotations of the device; and in response to the signal indicating the detected pitch or yaw movement of the input device, moving the displayed object a distance in a plane defined by the vertical and horizontal axes on the computer graphic display, the displayed object being moved translationally in substantially a single direction for each direction in which the device is rotated.

2. A method for effecting translational movements of a displayed object on an interactive computer graphic display as in claim 1 further comprising the steps of:

selectively inhibiting the device from producing a signal to permit reorientation of the device without translational movement of the displayed object on the computer graphic display; and selectively enabling the device for producing the signal in response to said one of pitch and yaw rotations of the device.

3. A method for providing a signal to effect translational movements of a displayed object on an interactive computer display using an input device including an inertial gyroscopic element that is manually movable in free space, the method comprising the steps of:

supporting the inertial gyroscopic element with respect to the device;

actuating the gyroscopic element to exhibit inertia relative to an inertial axis;

detecting rotational movement of the device relative to the inertial axis of the gyroscopic element; and providing a signal responsive to the rotation of the device relative to the inertial axis for effecting translational movements of the displayed object on the computer graphic display in substantially a single direction for each direction in which the device is rotated.

4. A method for providing a signal to effect translational movements of a displayed object on an interactive computer graphic display using an input device that is manually movable in free space, the method comprising the steps of:

detecting, by inertial means, rotational movement of the device about one axis; and providing a first signal responsive to the rotation of the device about the one axis for effecting translational movements of the displayed object on the computer graphic display in substantially a single direction for each direction in which the device is rotated.

5. A method according to claim 4 for providing signals to effect translational movements on an interactive computer graphic display along at least one of first and second coordinate axes, further comprising the steps of:

detecting, by inertial means, rotational movement of the device about a second axis not parallel to the one axis;

providing a second signal responsive to the rotation of the device about the second axis; and effecting translational movements on the display along a first coordinate axis of the computer display in response to the first signal, or along a second coordinate axis of the computer display in response to the second signal.

6. A graphical input device for providing a signal to effect translational movements of a displayed object on an interactive computer graphic display, comprising:

a housing adapted for manual movement in free space; and an inertial gyroscopic element mounted with respect to said housing, for providing a signal, in response to rotation of the housing about an axis, to effect translational movements of the displayed object on an interactive computer graphic display in substantially a single direction for each direction in which the device is rotated.

7. A graphical input device for providing a signal to effect translational movements of a displayed object on an interactive computer graphic display as in claim 6, wherein the gyroscopic element comprises an angular position gyroscope.

8. A graphical input device for providing a signal to effect translational movement of a displayed object on an interactive computer graphic display as in claim 7, wherein the angular position gyroscope comprises:

an inertial gyroscopic element disposed to spin about a spin axis;

a gimbal supporting the gyroscopic element with respect to the housing; and a sensor disposed with respect to the gimbal and the housing for producing said signal in response to rotation of the housing relative to the spin axis.

9. A graphical input device for providing a signal to effect the translational movement of a cursor on an interactive computer graphic display comprising:

a housing adapted for manual movement in free space;

an inertial gyroscopic element disposed to spin about one spin axis;

a gimbal supporting the gyroscopic element with respect to the housing; and a sensor disposed with respect to the gimbal and the housing for producing a signal, in response to rotation of the housing relative to one spin axis, to effect translational movement of the cursor in substantially a single direction for each direction in which the housing is rotated.

10. A graphical input device for providing a signal to effect the translational movement of a cursor on an interactive computer graphic display as in claim 9 further comprising a manually operable switch mounted with respect to the housing and operatively connected for selecting inhibiting the graphical input device from producing a signal to permit reorientation of the graphical input device without translational movement of the cursor in response to said signal, and for selectively enabling the graphical input device for producing said signal in response to rotational movement of the housing relative to the spin axis of the gyroscopic element.

11. A graphical input device for providing signals to effect translational movement of a cursor on an interactive computer graphic display as in claim 10 wherein the signal is produced in response to one of pitch and yaw rotational movement of the housing for effecting the translational movement of the cursor along one of vertical and horizontal Cartesian coordinate axes of the display in response to the signal.

12. An interactive computer graphic display system comprising a graphical input device as in claim 11 and further comprising a circuit coupled to the display for effecting the translational movement of the cursor along one of the horizontal and vertical Cartesian coordinate axes of the display in response to the signal.

13. A method for controlling translational movements of a displayed object on an interactive computer graphic display having vertical and horizontal Cartesian coordinate axes in response to one of pitch and yaw rotations of an input device, the method comprising the steps of:

detecting the pitch or yaw rotation of the device;

sensing an inertial response to provide a signal indicative of at least one of the pitch and yaw rotations of the device; and in response to detecting pitch or yaw movement of the input device, moving the displayed object a distance in a plane defined by the vertical and horizontal axes on the computer graphic display without rotating the displayed object.

14. A graphical input device for providing a signal to manipulate translational movements of a displayed object on an computer graphic display, comprising:

a housing adapted for manual movement in free space; and an inertial gyroscopic element mounted with respect to said housing, for providing a signal, in response to rotation of the housing about an axis, to manipulate translational movements of the displayed object on an interactive computer graphic display without causing the displayed object to be rotated.

15. A method for providing a signal to control translational movements of a displayed object on an interactive computer display using an input device including an inertial gyroscopic element that is manually movable in free space, the method comprising the steps of:

supporting the inertial gyroscopic element with respect to the device;

actuating the gyroscopic element to exhibit inertia relative to an inertial axis;

detecting rotational movement of the device relative to the inertial axis of the gyroscopic element; and providing a signal responsive to the rotation of the device relative to the inertial axis for controlling translational movements of the displayed object without causing the displayed object to be rotated.

* * * * *